United States Patent
Shim et al.

(10) Patent No.: US 9,531,572 B1
(45) Date of Patent: Dec. 27, 2016

(54) INTERFACE CIRCUIT FOR HIGH SPEED COMMUNICATION AND SYSTEM INCLUDING THE SAME

(71) Applicant: SK hynix Inc., Icheon-si Gyeonggi-do (KR)

(72) Inventors: Jong Joo Shim, Icheon-si (KR); Keun Soo Song, Icheon-si (KR)

(73) Assignee: SK HYNIX INC., Icheon-Si (KR)

( * ) Notice: Subject to any disclaimer, the term of this patent is extended or adjusted under 35 U.S.C. 154(b) by 0 days.

(21) Appl. No.: 14/987,959

(22) Filed: Jan. 5, 2016

(30) Foreign Application Priority Data

Jul. 13, 2015 (KR) .................. 10-2015-0099356

(51) Int. Cl.
| | |
|---|---|
| *H04L 7/04* | (2006.01) |
| *H04L 25/49* | (2006.01) |
| *H04L 7/00* | (2006.01) |
| *H04L 7/033* | (2006.01) |

(52) U.S. Cl.
CPC ......... *H04L 25/4917* (2013.01); *H04L 7/0045* (2013.01); *H04L 7/0087* (2013.01); *H04L 7/0331* (2013.01); *H04L 25/4919* (2013.01)

(58) Field of Classification Search
CPC ........ H04L 7/00; H04L 7/0008; H04L 7/0033; H04L 7/0037; H04L 7/0041; H04L 7/0045; H04L 7/005; H04L 7/0079; H04L 7/0087; H04L 25/4917

USPC ....... 375/316, 355, 288, 286, 287, 293, 354, 375/360, 371

See application file for complete search history.

(56) References Cited

U.S. PATENT DOCUMENTS

| | | | |
|---|---|---|---|
| 7,190,754 B1 * | 3/2007 | Chang ................... | H03L 7/07 375/371 |
| 7,860,472 B2 | 12/2010 | Nedachi | |
| 2004/0022311 A1 * | 2/2004 | Zerbe ................ | H04L 25/03038 375/229 |
| 2008/0130810 A1 * | 6/2008 | Bae ...................... | H04L 7/0337 375/355 |
| 2009/0196387 A1 * | 8/2009 | McCune, Jr. ......... | H04L 7/0338 375/355 |

FOREIGN PATENT DOCUMENTS

KR  1020030026751 A  4/2003

* cited by examiner

*Primary Examiner* — Siu Lee
(74) *Attorney, Agent, or Firm* — William Park & Associates Ltd.

(57) ABSTRACT

A system may include an interface circuit coupled to a wire bus. The interface circuit may receive a multi-level symbol according to a status of the wire bus. The interface circuit may include a clock recovery circuit configured to generate a recovered clock based on the multi-level symbol. The interface circuit may latch the multi-level symbol based on one of an external clock and the recovered clock according to an operation speed of the system.

17 Claims, 5 Drawing Sheets

INTERFACE CIRCUIT FOR HIGH SPEED COMMUNICATION AND SYSTEM INCLUDING THE SAME

CROSS-REFERENCES TO RELATED APPLICATION

The present application claims priority under 35 U.S.C. §119(a) to Korean application number 10-2015-0099356 filed on Jul. 13, 2015, in the Korean Intellectual Property Office, which is incorporated herein by reference in its entirety as set forth in full.

BACKGROUND

1. Technical Field

Various embodiments generally relate to a communication system, and more particularly to an interface circuit for high speed communication and a system including the same.

2. Related Art

A personal electronic device such as a personal computer, a tablet PC, a laptop computer, a smartphone may include various electronic elements. The electronic elements constituting the electronic device may communicate with each other at a high speed in order to process a great deal of data in a short time. In general, the electronic elements may send and receive data through an interface circuit. Data transmission between the electronic elements may occur in various ways. For example, data may be transmitted via parallel mode. Alternatively, data may be transmitted via serial mode.

As the performance of the electronic elements continues to improve, there is a growing need to introduce a communication method with wide bandwidth and reduced power consumption. To that end, various communication methods are being proposed to improve the performance of the interface circuit.

DETAILED DESCRIPTION

Various embodiments may be provided to an interface circuit capable of selectively using one of an external clock and a recovered clock according to a communication condition for receiving a signal, and a system including the same.

In an embodiment, an interface circuit may include a receiver configured to receive a multi-level symbol according to a status of a wire bus. The interface circuit may include a clock recovery circuit configured to generate a recovered clock based on the multi-level symbol. The interface circuit may include a clock selection circuit configured to generate an internal clock from one of an external clock and the recovered clock according to a clock selection signal. The interface circuit may include a latch and decoding circuit configured to latch the multi-level symbol based on the internal clock.

In an embodiment, a system may include a transmitter configured to change a status of a wire bus according to a multi-level symbol. The system may include a receiver configured to receive the multi-level symbol according to the status of the wire bus. The system may include a clock recovery circuit configured to generate a recovered clock based on the multi-level symbol provided from the receiver. The system may include a clock selection circuit configured to generate an internal clock from one of an external clock and the recovered clock according to an operation speed of the system. The system may include a latch and decoding circuit configured to generate an internal data from the multi-level symbol based on the internal clock.

In an embodiment, an interface circuit may include a receiver configured to receive a multi-level symbol according to a status of a wire bus. The interface circuit may include a clock recovery circuit configured to generate a recovered clock based on the multi-level symbol. The interface circuit may include a clock selection circuit configured to generate an internal clock from the recovered clock according to an operation speed of the interface circuit. The interface circuit may include a latch and decoding circuit configured to latch the multi-level symbol based on the internal clock.

Hereinafter, a semiconductor apparatus according to various embodiments will be described below with reference to the accompanying drawings.

Figure 1:
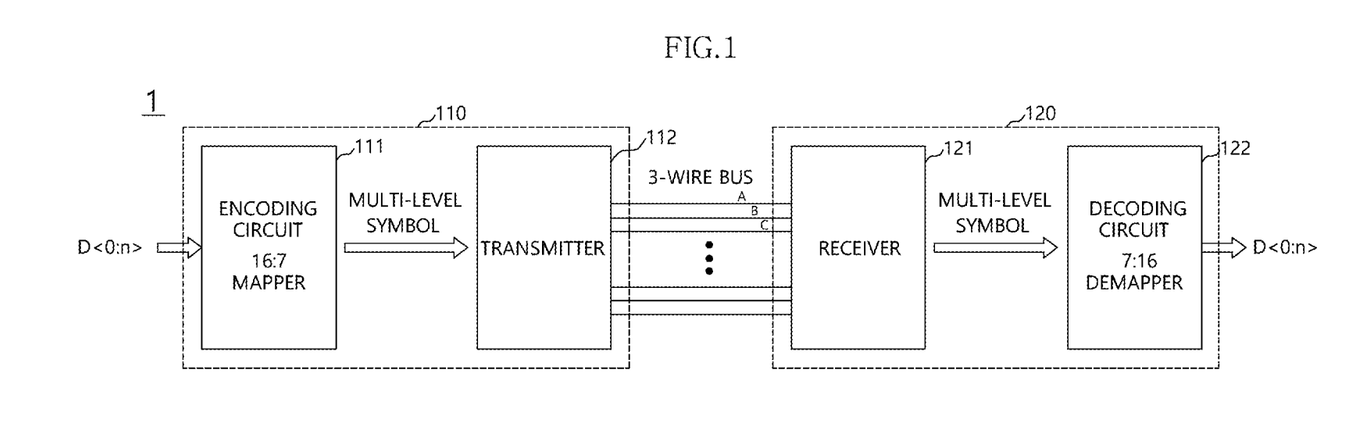
FIG. 1 is a block diagram illustrating an example of a representation of a system in accordance with an embodiment.

Referring to FIG. 1, the system 1 in accordance with an embodiment may include a master device 110 and a slave device 120. The master device 110 may be a host device which has control over the slave device 120. The master device 110 may perform arithmetic and logical operations and generate various control signals for controlling the slave device 120. The slave device 120 may perform various operations in response to various control signals generated by the master device 110. The master device 110 and the slave device 120 may configure a single link. The master device 110 and the slave device 120 may communicate with each other through a sub-link. Each of the master device 110 and the slave device 120 may include an interface circuit for high speed communication. The master device 110 and the slave device 120 may be electrically coupled to each other through signal transmission line, and may exchange signals through the signal transmission line and the interface circuits.

The system 1 in accordance with an embodiment may carry information (e.g., data, address, and command) through a balanced code multi-level signal transmission. The master device 110 and the slave device 120 may be electrically coupled to each other through a bus. For example, the bus may be a wire bus. The wire bus may include one or more wire groups, each of which includes one or more wires. The wire bus may be N-wire bus, and a single wire group may include N wires. For example, the wire bus may be 3-wire bus, and a single wire group may include three wires. The N wires (e.g., N=3) of each wire group may be driven by a voltage level corresponding to a symbol transmitted from the master device 110 to the slave device 120 or from the slave device 120 to the master device 110. For example, if the number of wires is three, the three wires of each wire group may be driven to one of high, middle, and low levels in order to transmit the symbol. For example, the high level may be a voltage level corresponding to ¾-Volt, the middle level may be a voltage level corresponding to ½-Volt, and the low level may be the voltage level of ¼-Volt.

The master device 110 may include an encoding circuit 111 and a transmitter 112. The encoding circuit 111 and the transmitter 112 may be an interface circuit for the balanced code multi-level signal transmission. The encoding circuit 111 may encode data D<0:n> into one or more multi-level symbols. For example, the encoding circuit 111 may be 16:7 mapper which transforms 16-bit data into seven multi-level symbols. The transmitter 112 may receive the multi-level symbols provided from the encoding circuit 111. The transmitter 112 may change the voltage level or status of the N-wire bus (e.g., N=3) according to the multi-level symbols. For example, the multi-level symbols may be 3-level symbols, and each of the multi-level symbols may include three phases. The 3-level symbols may include first to sixth symbols. The first to sixth symbols may be defined as "+x, −x, +y, −y, +z and −z." The first symbol "+x" may have a phase of "1, 0, 0," the second symbol "−x" may have a phase of "0, 1, 1," the third symbol "+y" may have a phase of "0, 1, 0," the fourth symbol "−y" may have a phase of "1, 0, 1," the fifth symbol "+z" may have a phase of "0, 0, 1," and the sixth symbol "−z" may have a phase of "1, 1, 0." The transmitter 112 may not use symbol having a phase of "0, 0, 0" or "1, 1, 1" since the transmitter 112 change the voltage level or status of the 3-wire bus according to the multi-level symbols.

The transmitter 112 may change statuses of the three wires A, B and C to the high level of ¾V, the middle level of ½-Volts, and the low level of ¼-Volt, respectively, in order to transmit the first symbol "+x." The transmitter 112 may change statuses of the three wires A, B and C to the low level of ¼-Volt, the high level of ¾-Volt, and the middle level of ½-Volts, respectively, in order to transmit the second symbol "−x." The transmitter 112 may change statuses of the three wires A, B and C to the middle level of ½-Volt, the high level of ¾-Volt, and the low level of ¼-Volt, respectively, in order to transmit the third symbol "+y." The transmitter 112 may change statuses of the three wires A, B and C to the middle level of ½-Volts, the low level of ¼-Volt, and the high level of ¾-Volt, respectively, in order to transmit the fourth symbol "−y." The transmitter 112 may change statuses of the 3 wires A, B and C to the low level of ¼-Volt, the middle level of ½-Volt, and the high level of ¾-Volt, respectively, in order to transmit the fifth symbol "+z." The transmitter 112 may change statuses of the three wires A, B and C to the high level of ¾-Volt, the middle level of ½-Volt, and the low level of ¼-Volt, respectively, in order to transmit the sixth symbol "−z."

The slave device 120 may include a receiver 121 and a decoding circuit 122. The receiver 121 and the decoding circuit 122 may be the interface circuit for the balanced code multi-level signal reception. The receiver 121 may be electrically coupled to the 3-wire bus, and may receive the multi-level symbols according to the voltage level of the 3-wire bus. Although not illustrated in FIG. 1, the receiver 121 may include three differential buffers respectively corresponding to the three wires. The three differential buffers may be electrically coupled to two or more of the three wires A, B, and C. For example, a first differential buffer may output a first phase of the multi-level symbols by differentially amplifying voltage level difference "A−B" of the first and second wires A and B, a second differential buffer may output a second phase of the multi-level symbols by differentially amplifying voltage level difference "B−C" of the second and third wires B and C, and a third differential buffer may output a third phase of the multi-level symbols by differentially amplifying voltage level difference "C−A" of the third and first wires C and A. Therefore, the receiver 121 may output the same multi-level symbols as original multi-level symbols transmitted from the transmitter 112 according to the voltage level or status of the 3-wire bus.

For example, when the first symbol "+x" is transmitted, the voltage level of the first wire A may be ¾-Volt, the voltage level of the second wire B may be ¼-Volt, and the voltage level of the third wire C may be ½-Volt. The receiver 121 may output "1" as the first phase of the multi-level symbol by differentially amplifying the voltage level difference "A−B" (i.e., +½-Volt) between the first and second wires A and B, output "0" as the second phase of the multi-level symbol by differentially amplifying the voltage level difference "B−C" (i.e., −¼-Volt) between the second and third wires B and C, and output "0" as the third phase of the multi-level symbol by differentially amplifying the voltage level difference "C−A" (i.e., −¼-Volt) between the third and first wires C and A.

The decoding circuit 122 may decode the multi-level symbol into data D<0:n>. The decoding circuit 122 may be, for example, a 7:16 demapper which decodes the seven multi-level symbols into the 16-bit data. Encoding of the encoding circuit 111 and decoding of the decoding circuit 122 may be in complementary relations. Although FIG. 1 illustrates data transmission from the master device 110 to the slave device 120, the scope of the present disclosure is not limited thereto. The slave device 120 may further include elements such as the encoding circuit 111 and the transmitter 112 in order to transmit data to the master device 110, and the master device 110 may further include elements such as the receiver 121 and the decoding circuit 122 in order to receive data from the slave device 120.

The master device 110 may control operations of the slave device 120. The master device 110 may execute an operating system (OS), and perform various arithmetic and logical operations in an electronic device. For example, the master device 110 may include a processor. The processor may be one or more of the central processing circuit (CPU), the graphic processing circuit (GPU), the multi-media processor (MMP), the digital signal processor. The master device 110 may be implemented in a form of the system on chip (SoC) by combining processor chips having various functions such as the application processor (AP).

The slave device 120 may perform various operations under the control of the master device 110. The slave device 120 may include all elements operating under the control of the master device 110. For example, the slave device 120 may include modules capable of performing various functions of the system memory, the power controller, the communication module, the multimedia module, the input/output module, and so forth. As an example, the slave device 120 may be a memory device. The memory device may include the volatile memory device such as the static RAM (SRAM), the dynamic RAM (DARM), the synchronous DRAM (SDRAM), and also one or more of the non-volatile memory devices such as the read only memory (ROM), the programmable ROM (PROM), the electrically erase and programmable ROM (EEPROM), the electrically programmable ROM (EPROM), the flash memory, the phase change RAM (PRAM), the magnetic RAM (MRAM), the resistive RAM (RRAM), and the ferroelectric RAM (FRAM).

Figure 2:
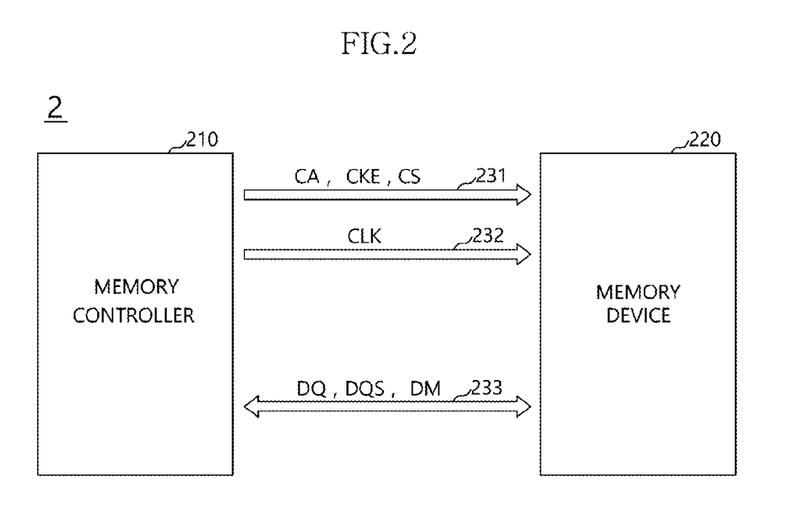
FIG. 2 is a block diagram illustrating an example of a representation of a memory system in accordance with an embodiment.

FIG. 2 is a block diagram illustrating an example of a representation of a memory system 2 in accordance with an embodiment. Referring to FIG. 2, the memory system 2 may include a memory controller 210 and a memory device 220. The memory controller 210 and the memory device 220 may communicate with each other through one or more buses. The memory controller 210 may act as the master device 110, and the memory device 220 may act as the slave device 120 operating under the control of the memory controller 210. The memory controller 210 may communicate with an external host device, and may provide various control signals to the memory device 220 in order to control the memory device 220. The memory controller 210 and the memory device 220 may communicate with each other through the balanced code multi-level signal transmission. To this end, the memory controller 210 and the memory device 220 may serially transmit a multi-level symbol. The multi-level symbol may be a general binary data or a control signal encoded to have two or more levels, statuses or phases. For example, the multi-level symbol may be the 3-level symbol.

The buses may include first to third buses 231, 232, and 233. The first bus 231 may be a command bus. The first bus 231 may be a signal transmission line group for transmitting a command and address signal CA, and may transmit the multi-level symbol into which the command and address signal CA, a clock enable signal CKE, a chip selection signal CS, and so forth are encoded. The second bus 232 may be a clock bus. The second bus 232 may be a signal transmission line group for transmitting a clock CLK. The third bus 233 may be a data bus. The third bus 233 may be a signal transmission line group for transmitting a multi-level symbol into which data DQ are encoded. The symbols transmitted through the third bus 233 may include information about a data strobe signal DQS and/or a data masking signal DM as well as information about the data DQ. That is, information about the data DQ, the data strobe signal DQS and the data masking signal DM may be encoded into the signals transmitted through the third bus 233.

The memory controller 210 and the memory device 220 may perform write and read operations. During the write and read operations, the memory controller 210 may provide the memory device 220 with one or more multi-level symbols having information about the command and address signal CA through the first bus 231, and may provide the memory device 220 with the clock CLK through the second bus 232. During the write operation, the memory controller 210 may provide the memory device 220 with the symbol, which has information about the data DQ and the data strobe signal DQS, through the third bus 233. Further, the memory controller 210 may add information of the data masking signal DM to the symbol. During the read operation, the memory device 220 may provide the memory controller 210 with the symbol, which has the data DQ and the data strobe signal DQS, through the third bus 233.

Each of the memory controller 210 and the memory device 220 may include a transmission interface circuit for generating the symbol to be transmitted through the third bus 233 and a reception interface circuit for recovering the symbol into original data signals and data strobe signals. In an embodiment, the transmission interface circuit may correspond to the encoding circuit 111 and the transmitter 112 illustrated in FIG. 1, and the reception interface circuit may correspond to the receiver 121 and the decoding circuit 122 illustrated in FIG. 1. For example, the transmission interface circuit may generate the symbol by encoding the original data signals and the data strobe signals into the symbol, and the reception interface circuit may recover the symbol by decoding the symbol back into the original data signals and the data strobe signal signals.

Figure 3:
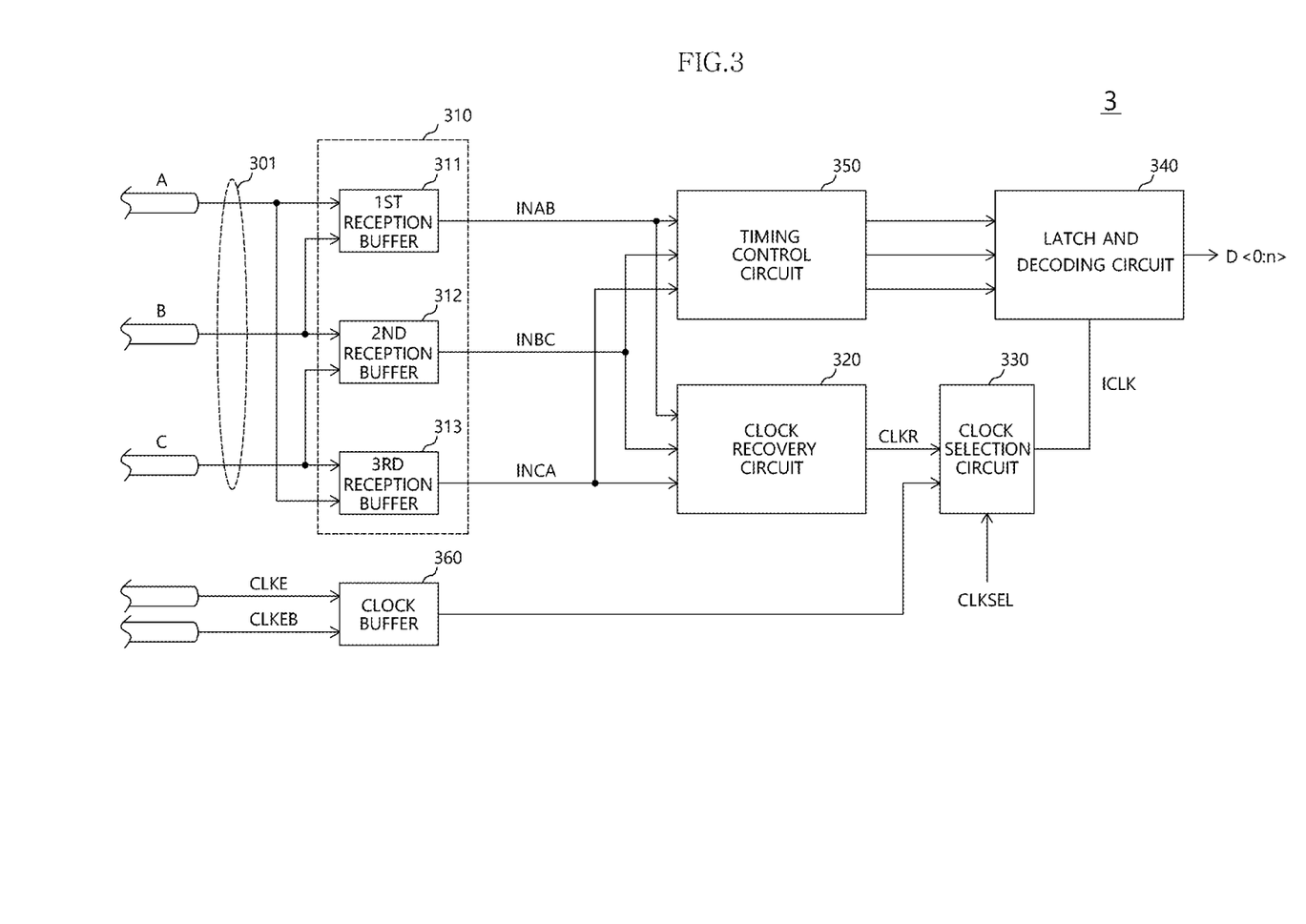
FIG. 3 is a block diagram illustrating an example of a representation of an interface circuit in accordance with an embodiment.

FIG. 3 is a block diagram illustrating an example of a representation of an interface circuit 3 in accordance with an embodiment. The interface circuit 3 may be used for communication through the balanced code multi-level signal transmission. The interface circuit 3 may be a reception interface circuit for receiving a multi-level symbol transmitted from an external device. The interface circuit 3 may include a receiver 310, a clock recovery circuit 320, a clock selection circuit 330, and a latch and decoding circuit 340. The receiver 310 may be electrically coupled to a wire bus 301. The wire bus 301 may include one or more wires. A number of wires included in the wire bus 301 may depend on a multi-level symbol to be transmitted through the wire bus 301. For example, when the multi-level symbol is a 3-level symbol, the wire bus 301 may include three wires. Although the examples of the multi-level symbol are described and illustrated as being a 3-level symbol, the number of levels of the symbol is provided as an example and not a limitation. The receiver 310 may receive the multi-level symbol according to the status of the wire bus 301.

The wire bus 301 may include first to third wires A, B, and C. The wire bus 301 may include first to third reception buffers 311, 312, and 313. The first reception buffer 311 may be electrically coupled to the first and second wires A and B, the second reception buffer 312 may be electrically coupled to the second and third wires B and C, and the third reception buffer 313 may be electrically coupled to the third and first and second wires C and A. The first reception buffer 311 may generate a first phase INAB of the multi-level symbol by differentially amplifying the statuses of the first and second wires A and B. For example, the first reception buffer 311 may generate the first phase INAB of the multi-level symbol by amplifying voltage level difference between the first and second wires A and B. The second reception buffer 312 may generate a second phase INBC of the multi-level symbol by differentially amplifying the statuses of the second and third wires B and C. For example, the second reception buffer 312 may generate the second phase INBC of the multi-level symbol by amplifying voltage level difference between the second and third wires B and C. The third reception buffer 313 may generate a third phase INCA of the multi-level symbol by differentially amplifying the statuses of the third and first wires C and A. For example, the third reception buffer 313 may generate the third phase INCA of the multi-level symbol by amplifying voltage level difference between the third and first wires C and A.

The clock recovery circuit 320 may generate a recovered clock CLKR based on the multi-level symbol provided from the receiver 310. According to the balanced code multi-level signal transmission, the statuses of one or more of the first to third wires A, B, and C may continuously change. Therefore, one or more of the first to third phases INAB, INBC, and INCA of the multi-level symbol may continuously change from a logical level to another logical level. The clock recovery circuit 320 may change a level of the recovered clock CLKR by detecting one or more transitions of the first to third phases INAB, INBC, and INCA of the multi-level symbol. The clock recovery circuit 320 may toggle the recovered clock CLKR according to the transitions of one or more of the first to third phases INAB, INBC, and INCA. The activation of the recovered clock CLKR may be determined based on an operation speed of a system including the interface circuit 3. For example, the clock recovery circuit 320 may be deactivated in order not to generate the recovered clock CLKR from the multi-level symbol when the system and the interface circuit 3 operate in a high-frequency band, and may be activated in order to generate the recovered clock CLKR from the multi-level symbol when the system and the interface circuit 3 operate in a low-frequency band lower than the high-frequency band.

The clock selection circuit 330 may receive the recovered clock CLKR and an external clock CLKE. The external clock CLKE may be provided from an external device communicating with the interface circuit 3. The external clock CLKE may be transmitted through another wire or another signal transmission line. The external clock CLKE may be provided from an interface circuit of the external device communicating with the interface circuit 3. The recovered clock CLKR and the external clock CLKE may have the same or substantially the same frequency as each other. The external clock CLKE may be one of a single-ended signal and a differential signal. As an example, FIG. 3 illustrates the external clock CLKE as the differential signal having a positive phase signal CLKE and a negative phase signal CLKEB, which are provided through different wire or different signal transmission line. The interface circuit 3 may further include a clock buffer 360 for receiving the external clock CLKE.

The clock selection circuit 330 may generate an internal clock ICLK from one of the recovered clock CLKR and the external clock CLKE according to the operation speed of a system including the interface circuit 3. For example, the clock selection circuit 330 may generate the internal clock ICLK from the external clock CLKE when the system and the interface circuit 3 operate in a high-frequency band, and may generate the internal clock ICLK from the recovered clock CLKR when the system and the interface circuit 3 operate in a low-frequency band lower than the high-frequency band.

The clock selection circuit 330 may generate the internal clock ICLK from one of the recovered clock CLKR and the external clock CLKE in response to a clock selection signal CLKSEL. For example, the clock selection circuit 330 may output the recovered clock CLKR as the internal clock ICLK when the clock selection signal CLKSEL is disabled, and may output the external clock CLKE as the internal clock ICLK when the clock selection signal CLKSEL is enabled. The clock selection circuit 330 may include a multiplexer using the clock selection signal CLKSEL as a control signal and output one of the recovered clock CLKR and the external clock CLKE as the internal clock ICLK. The clock selection signal CLKSEL may be provided from the external device communicating with the interface circuit 3. The external device may provide the clock selection signal CLKSEL according to the operation speed and operation circumstances of a system including the interface circuit 3. Also, the clock selection signal CLKSEL may be internally generated in the interface circuit 3. For example, the clock selection signal CLKSEL may be generated by detecting the external clock CLKE. That is, the clock selection signal CLKSEL may be enabled when the external clock CLKE has a high frequency, and may be enabled when the external clock CLKE has a low frequency. The clock selection circuit 330 may include a frequency detection circuit.

The clock recovery circuit 320 may receive the clock selection signal CLKSEL. The activation of the clock recovery circuit 320 may be determined according to the clock selection signal CLKSEL. For example, the clock recovery circuit 320 may be deactivated in order not to generate the recovered clock CLKR, thereby reducing power consumption of the interface circuit 3 when the clock selection signal CLKSEL is enabled. The clock recovery circuit 320 may be activated in order to generate the recovered clock CLKR when the clock selection signal CLKSEL is disabled.

The latch and decoding circuit 340 may generate internal data D<0:n> from the multi-level symbol according to the internal clock ICLK. The latch and decoding circuit 340 may store each of the first to third phases INAB, INBC, and INCA of the multi-level symbol, which are provided from the receiver 310. For example, the latch and decoding circuit 340 may latch each of the first to third phases INAB, INBC, and INCA of the multi-level symbol in synchronization with the internal clock ICLK. The latch and decoding circuit 340 may generate the internal data D<0:n> corresponding to the multi-level symbol by decoding the latched multi-level symbol. The latch and decoding circuit 340 may control the interface circuit 3 to precisely generate the internal data D<0:n> by arranging the multi-level symbol provided from the receiver 310 to an edge of the internal clock ICLK.

Referring to FIG. 3, the interface circuit 3 may further include a timing control circuit 350. The timing control circuit 350 may be provided in order to secure a setup/hold margin of the multi-level symbol. The timing control circuit 350 may receive the first to third phases INAB, INBC, and INCA of the multi-level symbol provided from the receiver 310, and delay the first to third phases INAB, INBC, and INCA. The timing control circuit 350 may provide the latch and decoding circuit 340 with the delayed multi-level symbol. The timing control circuit 350 may be a variable delay circuit. An amount of delay time of the timing control circuit 350 may vary. For example, the amount of delay time of the timing control circuit 350 may vary according to a control signal internally generated in the system including the interface circuit 3. Also, the amount of delay time of the timing control circuit 350 may vary according to a control signal provided from the external device communicating with the interface circuit 3. The amount of delay time of the timing control circuit 350 may correspond to a time required for the clock recovery circuit 320 to generate the recovered clock CLKR from the multi-level symbol. The timing control circuit 350 may secure the setup/hold margin of the first to third phases INAB, INBC, and INCA of the multi-level symbol in order for the latch and decoding circuit 340 to correctly latch the multi-level symbol by delaying the first to third phases INAB, INBC, and INCA as much as the time required to generate the recovered clock CLKR.

Figure 4:
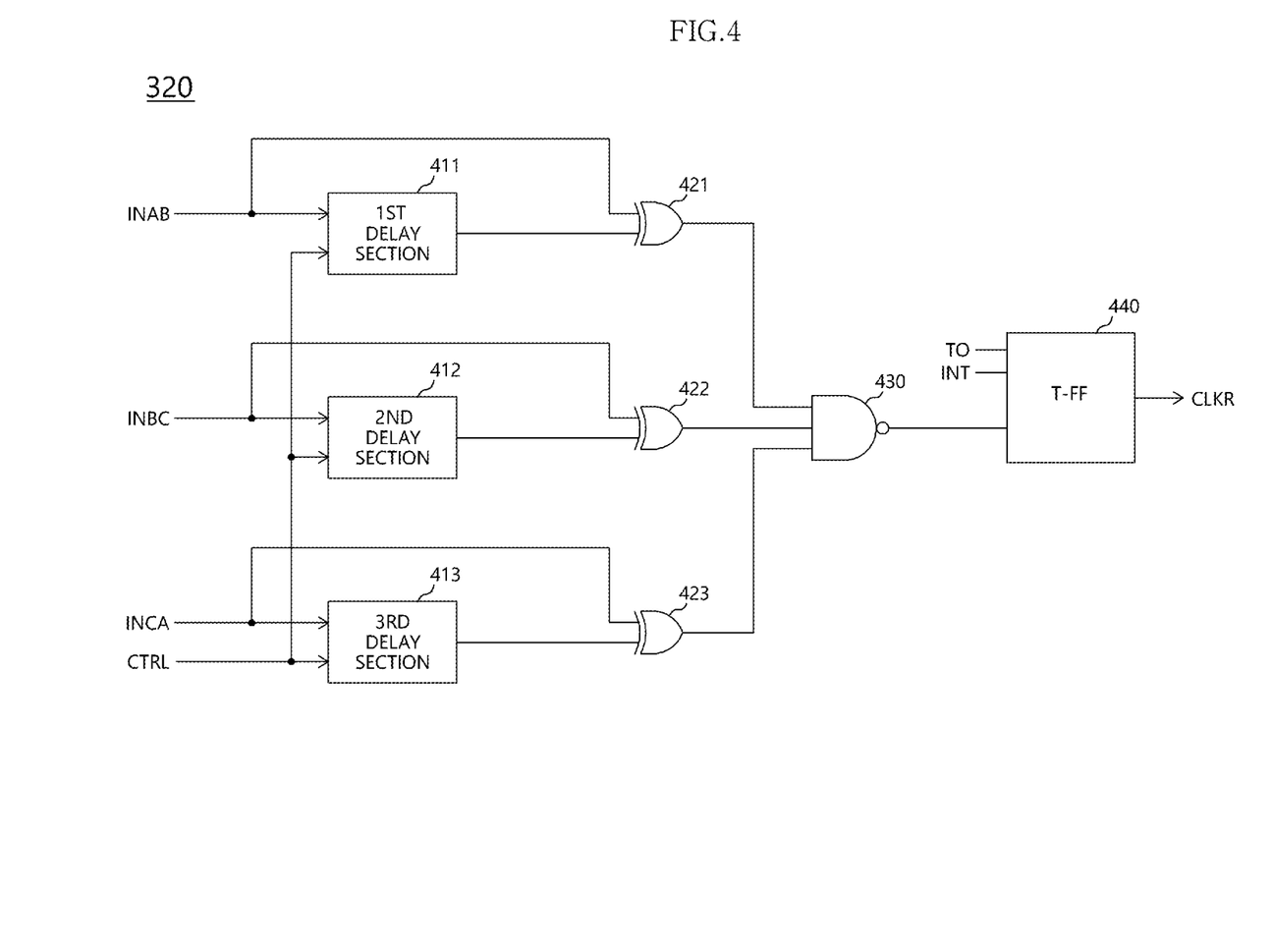
FIG. 4 is a block diagram illustrating an example of a representation of a clock recovery circuit illustrated in FIG. 3.

FIG. 4 is a block diagram illustrating an example of a representation of the clock recovery circuit 320 illustrated in FIG. 3. The clock recovery circuit 320 may include first to third delay section 411, 412, and 413, first to third exclusive OR gates 421, 422, and 423, a NAND gate 430, and a T flip-flop 440. The first to third delay section 411, 412, and 413 and the first to third exclusive OR gates 421, 422, and 423 are serially coupled to each other, respectively, and may receive one of the first to third phases INAB, INBC, and INCA of the multi-level symbol. The first delay section 411 may delay the first phase INAB of the multi-level symbol. The first exclusive OR gate 421 may receive the first phase INAB of the multi-level symbol and an output of the first delay section 411. The second delay section 412 may delay the second phase INBC of the multi-level symbol. The second exclusive OR gate 422 may receive the second phase INBC of the multi-level symbol and an output of the second delay section 412. The third delay section 413 may delay the third phase INCA of the multi-level symbol. The third exclusive OR gate 423 may receive the third phase INCA of the multi-level symbol and an output of the third delay section 413. The first to third delay section 411, 412, and 413 may receive the clock selection signal CLKSEL. The first to third delay section 411, 412, and 413 may be deactivated when the clock selection signal CLKSEL is enabled.

The NAND gate 430 may receive outputs of the first to third exclusive OR gates 421, 422, and 423. The T flip-flop 440 may generate the recovered clock CLKR based on an output of the NAND gate 430. The T flip-flop 440 may further receive an initial value set signal TO and a reset signal INT. The initial value set signal TO may allow the T flip-flop 440 to set an initial output level thereof, and the reset signal INT may reset the T flip-flop 440.

Figure 5:
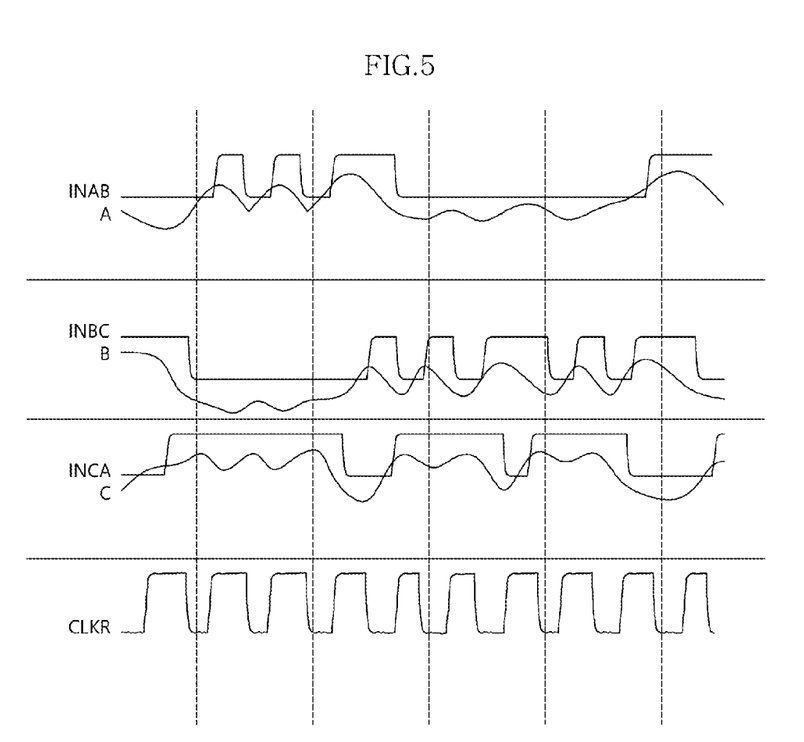
FIG. 5 is a timing diagram illustrating an example of a representation of an operation of the clock recovery circuit illustrated in FIG. 4.

FIG. 5 is a timing diagram illustrating an example of a representation of an operation of the clock recovery circuit 320 illustrated in FIG. 4. The statuses of one or more of the first to third wires A, B, and C may continuously change in order to transmit the multi-level symbol. Therefore, one or more of the first to third phases INAB, INBC, and INCA of the multi-level symbol provided from the receiver 310 may continuously change. FIG. 5 illustrates waveforms of the statuses of the first to third wires A, B, and C and the first to third phases INAB, INBC, and INCA. The statuses of one or more of the first to third wires A, B, and C may continuously change to one of the high, middle, and low levels in order to transmit the multi-level symbol. The first reception buffer 311 may generate the first phase INAB of the multi-level symbol by differentially amplifying the statuses of the first and second wires A and B. For example, the first reception buffer 311 may generate the first phase INAB of the multi-level symbol by amplifying voltage level difference between the first and second wires A and B. The second reception buffer 312 may generate the second phase INBC of the multi-level symbol by differentially amplifying the statuses of the second and third wires B and C. For example, the second reception buffer 312 may generate the second phase INBC of the multi-level symbol by amplifying voltage level difference between the second and third wires B and C. The third reception buffer 313 may generate the third phase INCA of the multi-level symbol by differentially amplifying the statuses of the third and first wires C and A. For example, the third reception buffer 313 may generate the third phase INCA of the multi-level symbol by amplifying voltage level difference between the third and first wires C and A.

The clock recovery circuit 320 may change the level of the recovered clock CLKR when one or more of the first to third phases INAB, INBC, and INCA of the multi-level symbol change. Therefore, the recovered clock CLKR may toggle whenever one or more of the first to third phases INAB, INBC, and INCA of the multi-level symbol change. Accordingly, the recovered clock CLKR may be generated to have a frequency corresponding to the operation speed of the system including the interface circuit 3. Here, since the statuses of one or more of the first to third wires A, B, and C continuously change from one to another between the high, middle, and low levels, there may occur a skew among the first to third phases INAB, INBC, and INCA of the multi-level symbol generated by the receiver 310. Therefore, the recovered clock CLKR generated by the clock recovery circuit 320 may have a great deal of jitter and may have an irregular duty cycle. When the system and the interface circuit 3 operate in a low-frequency band lower than the high-frequency band, the jitter and the changing duty may be ignored because the latch and decoding circuit 340 may correctly latch the multi-level symbol despite the jitter and the irregular duty cycle. However, when the system and the interface circuit 3 operate in a high-frequency band, the jitter and the irregular duty cycle should be considered because the latch and decoding circuit 340 may not correctly latch the multi-level symbol due to the jitter and the changing duty. The interface circuit 3 in accordance with an embodiment may use the external clock CLKE having relatively less jitter and more constant duty cycle than the recovered clock CLKR when the system and the interface circuit 3 operate in a high-frequency band. Therefore, the interface circuit 3 may generate the internal data D<0:n> by correctly latching the multi-level symbol even when the system and the interface circuit 3 operate in a high-frequency band.

While certain embodiments have been described above, it will be understood to those skilled in the art that the embodiments described are by way of example only. Accordingly, the interface circuit for high speed communication and system including the same should not be limited based on the described embodiments. Rather, the interface circuit for high speed communication and system including the same described herein should only be limited in light of the claims that follow when taken in conjunction with the above description and accompanying drawings.

What is claimed is:

1. An interface circuit comprising:
   a receiver configured to receive a multi-level symbol according to a status of a wire bus;
   a clock recovery circuit configured to generate a recovered clock based on the multi-level symbol, wherein whether or not the clock recovery circuit operates is determined based on a clock selection signal;
   a clock selection circuit configured to generate an internal clock from one of an external clock and the recovered clock according to the clock selection signal; and
   a latch and decoding circuit configured to latch the multi-level symbol based on the internal clock.

2. The interface circuit of claim 1, wherein the wire bus comprises first to third wires, and the receiver comprises:
   a first reception buffer configured to output a first phase of the multi-level symbol by differentially amplifying statuses of the first and second wires;
   a second reception buffer configured to output a second phase of the multi-level symbol by differentially amplifying statuses of the second and third wires; and
   a third reception buffer configured to output a third phase of the multi-level symbol by differentially amplifying statuses of the third and first wires.

3. The interface circuit of claim 1, wherein the clock recovery circuit changes a level of the internal clock by detecting a phase transition of the multi-level symbol.

4. The interface circuit of claim 1, wherein the recovered clock and the external clock have the same or substantially the same frequency as each other.

5. The interface circuit of claim 1, wherein the clock selection signal is provided from an external device of the interface circuit.

6. The interface circuit of claim 1, wherein the clock selection signal is generated by detecting a frequency of the external clock.

7. The interface circuit of claim 1, wherein the clock selection circuit outputs the external clock as the internal clock when the interface circuit operates in a high-frequency band, and outputs the recovered clock as the internal clock when the interface circuit operates in a low-frequency band lower than the high-frequency band.

8. The interface circuit of claim 1, wherein the latch and decoding circuit latches the multi-level symbol in synchronization with the internal clock, and transforms the latched multi-level symbol into an internal data.

9. The interface circuit of claim 1, further comprising a timing control circuit configured to delay the multi-level symbol,
wherein an amount of delay time of the timing control circuit corresponds to a time required for the clock recovery circuit to generate the recovered clock.

10. A system comprising:
a transmitter configured to change a status of a wire bus according to a multi-level symbol;
a receiver configured to receive the multi-level symbol according to the status of the wire bus;
a clock recovery circuit configured to generate a recovered clock based on the multi-level symbol provided from the receiver;
a clock selection circuit configured to generate an internal clock from one of an external clock having the same or substantially the same frequency with the recovered clock and the recovered clock according to an operation speed of the system; and
a latch and decoding circuit configured to generate an internal data from the multi-level symbol based on the internal clock.

11. The system of claim 10, wherein the wire bus comprises first to third wires, and the receiver comprises:
a first reception buffer configured to output a first phase of the multi-level symbol by differentially amplifying statuses of the first and second wires;
a second reception buffer configured to output a second phase of the multi-level symbol by differentially amplifying statuses of the second and third wires; and
a third reception buffer configured to output a third phase of the multi-level symbol by differentially amplifying statuses of the third and first wires.

12. The system of claim 10, wherein the clock recovery circuit changes a level of the internal clock by detecting a phase transition of the multi-level symbol.

13. The system of claim 10, wherein the clock recovery circuit does not generate the recovered clock when the system operates in a high-frequency band, and generates the recovered clock when the system operates in a low-frequency band lower than the high-frequency band.

14. The system of claim 10, wherein the clock selection circuit outputs the external clock as the internal clock when the system operates in a high-frequency band, and outputs the recovered clock as the internal clock when the system operates in a low-frequency band lower than the high-frequency band.

15. The system of claim 10, wherein the latch and decoding circuit latches the multi-level symbol in synchronization with the internal clock, and transforms the latched multi-level symbol into the internal data.

16. The system of claim 10, further comprising a timing control circuit configured to delay the multi-level symbol,
wherein an amount of delay time of the timing control circuit corresponds to a time required for the clock recovery circuit to generate the recovered clock.

17. An interface circuit comprising:
a receiver configured to receive a multi-level symbol according to a status of a wire bus;
a clock recovery circuit configured to generate a recovered clock based on the multi-level symbol;
a clock selection circuit configured to output an external clock as an internal clock when the interface circuit operates in a high-frequency band, and to output the recovered clock as the internal clock when the interface circuit operates in a low-frequency band lower than the high-frequency band; and
a latch and decoding circuit configured to latch the multi-level symbol based on the internal clock.

* * * * *